(12) United States Patent
Hill et al.

(10) Patent No.: US 7,474,329 B2
(45) Date of Patent: *Jan. 6, 2009

(54) APPARATUS AND METHOD TO EVALUATE AN ILLUMINATED PANEL

(75) Inventors: Richard Duane Hill, Johnson City, NY (US); Stephen P. Cook, Greene, NY (US); Thomas J. Lipko, Carbondale, PA (US); Robert Burns, Castle Creek, NY (US)

(73) Assignee: BAE Systems Controls, Inc., Johnson City, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 11/609,951

(22) Filed: Dec. 13, 2006

(65) Prior Publication Data

US 2007/0085906 A1  Apr. 19, 2007

Related U.S. Application Data

(63) Continuation of application No. 10/104,671, filed on Mar. 22, 2002, now Pat. No. 7,167,197.

(51) Int. Cl.
*H04N 17/00* (2006.01)

(52) U.S. Cl. .................. 348/130; 348/180; 348/92; 382/141

(58) Field of Classification Search .............. None
See application file for complete search history.

(56) References Cited

U.S. PATENT DOCUMENTS

| 4,797,924 | A | * | 1/1989 | Schnars et al. | 704/275 |
|---|---|---|---|---|---|
| 5,442,391 | A | * | 8/1995 | Hung et al. | 348/190 |
| 5,572,444 | A | * | 11/1996 | Lentz et al. | 702/117 |
| 6,611,249 | B1 | * | 8/2003 | Evanicky et al. | 345/102 |
| 6,873,438 | B2 | * | 3/2005 | Fotland | 358/1.9 |
| 7,050,622 | B2 | * | 5/2006 | Morishima et al. | 382/148 |

* cited by examiner

*Primary Examiner*—Gims S Philippe
*Assistant Examiner*—Erick Rekstad
(74) *Attorney, Agent, or Firm*—Charles L. Moore; Moore & Van Allen, PLLC

(57) ABSTRACT

An apparatus to evaluate an illuminated panel comprises a camera to acquire a real-time digital color image of the illuminated panel and a stored digital color image of a standard illuminated panel. A monitor is provided to alternately display the real-time image and the stored image to detect any differences in the illuminated panel.

25 Claims, 2 Drawing Sheets

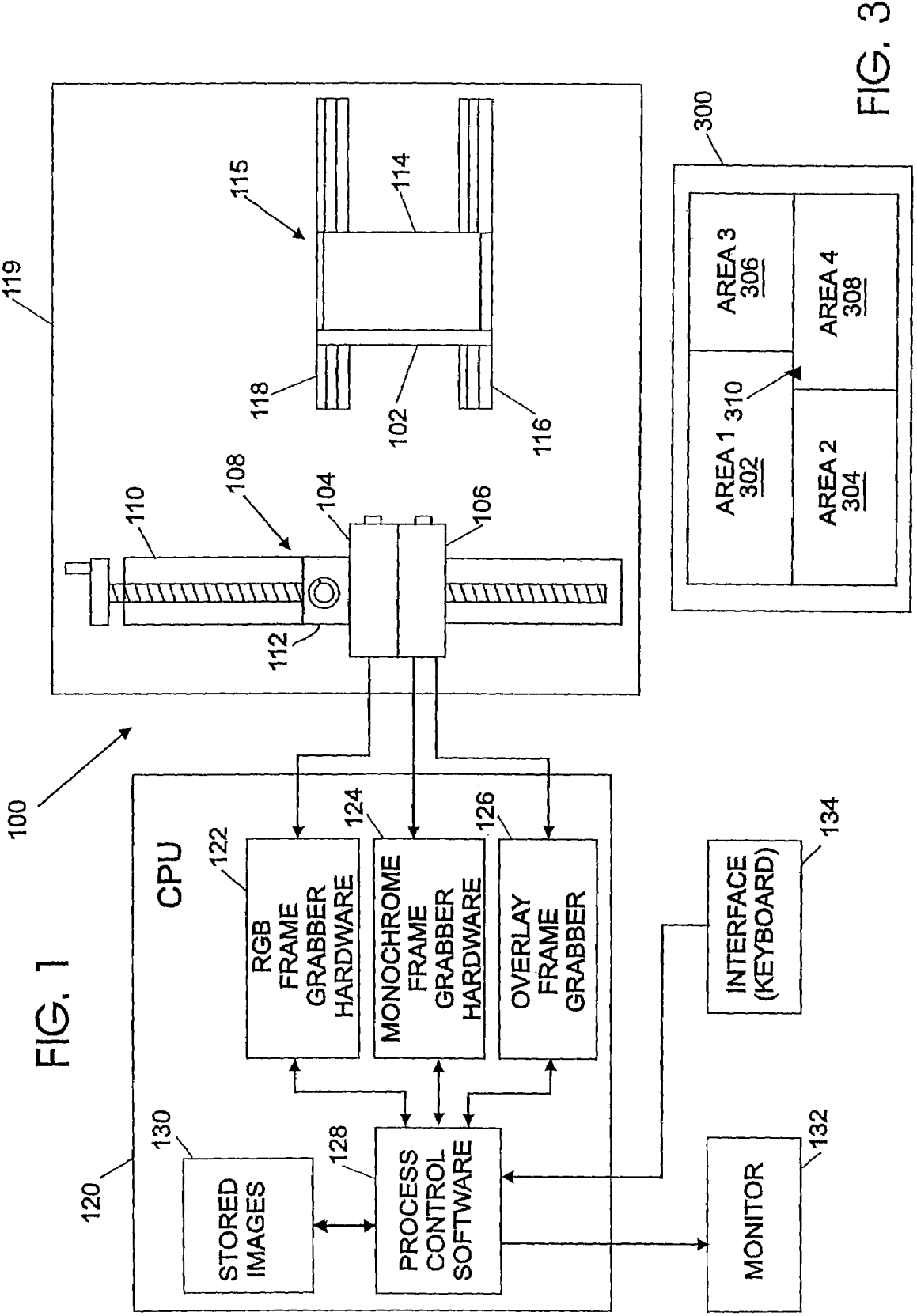

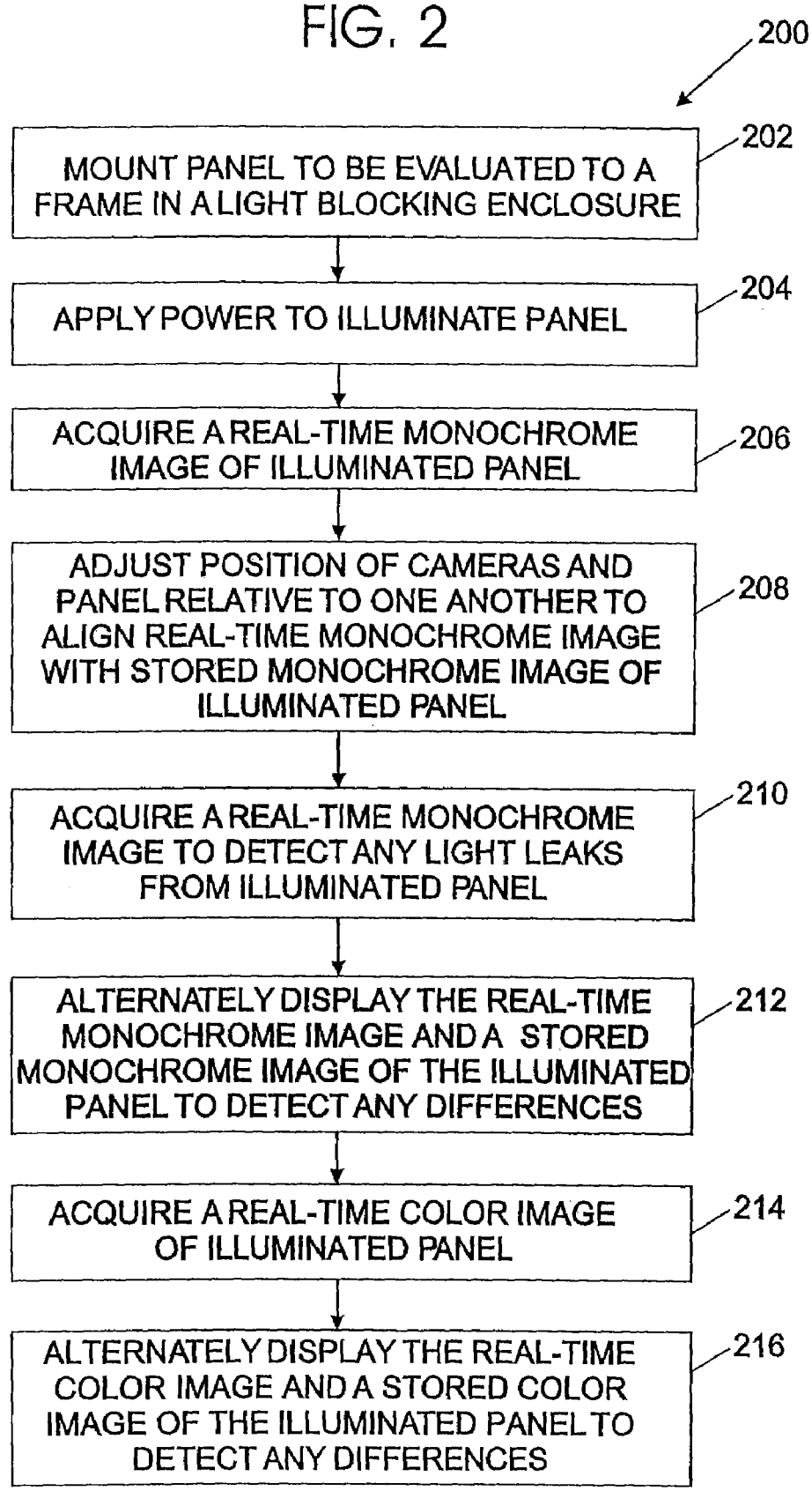

APPARATUS AND METHOD TO EVALUATE AN ILLUMINATED PANEL

CROSS-REFERENCES

This application is a continuation application of U.S. patent application Ser. No. 10/104,671, filed Mar. 22, 2002, the contents of which are incorporated herein by reference.

FIELD OF THE INVENTION

The present invention relates generally to illuminated panels, instrument panels or the like for use in aircraft, space vehicles or other applications and more particularly to an apparatus and method to evaluate or test such panels.

BACKGROUND OF THE INVENTION

Illuminated or lighted panels or instrument panels are used extensively in aircraft, space vehicles and in other applications. These panels can include numerous illuminated buttons, switches, indicator lights, displays and the like. Proper levels of illumination and visual acuity under different conditions can be critical, such as direct sun light, night time conditions, and during use of light amplifying vision aids, such as night vision goggles (NVG) or the like. Unwanted light leaks or escapes from an illuminated panel can adversely effect the use of night vision goggles and the like. The different illuminated buttons, switches, indicator lights and the like can be of multiple different colors that can have different meanings to a pilot. Therefore, the colors of the different buttons, switches and lights need to be accurate, clearly distinguishable on the same panel and uniform from one panel to another, so that a pilot or operator can properly operate an aircraft's systems and take appropriate actions, sometimes in fractions of a second without any hesitation. The different buttons, switches, lights or displays can also be etched or silk screened with lettering, labels or other symbols that aid a pilot or operator.

Current aircraft and space vehicles are becoming increasingly complex systems to operate and the workload on a pilot or operator can be extremely challenging at times. Accordingly, the illuminance under various conditions, the coloring, symbols and the like on the different buttons, switches, annunciator lights, and displays that permit a pilot to fly an aircraft and operate different systems of an aircraft or the like need to be accurate, uniform and free of defects.

Such panels are currently tested by placing a panel under test next to a standard panel and comparing the two panels visually. Accordingly, such evaluations can be time consuming and subject to human error. A darkroom is also required to perform the evaluation or comparison of the panels to prevent ambient lighting conditions from affecting the test results and to provide accuracy and uniformity from test to test and between different panels under test. Thus a separate darkroom must be maintained and the panels to be tested must be transported to the darkroom. Additionally, the standardized panel needs to be calibrated periodically to insure that its luminance and different colors have not deteriorated.

Accordingly, for the reason stated above, and for other reasons that will become apparent upon reading and understanding the present specification, there is a need for an apparatus and method to evaluate an illuminated panel under different conditions that occupies minimal space and is portable. There is also a need for an apparatus and method to evaluate an illuminated panel that is more efficient and less subject to human error and that may be automated or semi-automated. There is also a need for an apparatus and method to evaluate an illuminated panel that does not require periodic calibration of a standard panel.

SUMMARY OF THE INVENTION

In accordance with the present invention, an apparatus to evaluate an illuminated panel includes a camera to acquire a real-time digital color image of the illuminated panel. A stored digital color image of a standard or calibrated illuminated panel is provided and a monitor is provided to alternately display the real-time image and the stored image for detection of any differences in the illuminated panel.

In accordance with another embodiment of the present invention a method of evaluating an illuminated panel includes acquiring a real-time digital color image of the illuminated panel; and alternately displaying the real-time color image and a stored color image of a standard or calibrated illuminated panel for detection of any differences.

BRIEF DESCRIPTION OF THE DRAWINGS

In the drawings, like numerals describe substantially similar components throughout the several views.

FIGS. 1 is a block diagram of an apparatus to evaluate an illuminated panel in accordance with the present invention.

FIG. 2 is a flow chart of a method to evaluate an illuminated panel in accordance with the present invention.

FIG. 3 is an example of dividing a illuminated panel into multiple areas for detailed evaluation in accordance with an embodiment of the present invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments can be utilized and that process or mechanical changes may be made without departing from the scope of the present invention.

FIGS. 1 is a block diagram of an apparatus 100 to evaluate an illuminated panel 102 in accordance with the present invention. The apparatus 100 can include a first camera 104 and a second camera 106. The first camera 104 can be a digital color video camera, such as a Sony® model XC-300 or the like, to evaluate the panel 102 in the visual spectrum between about 400 nM and about 700 nM, and the second camera 106 can be a monochrome video camera with the filters removed, such as a JAI® model CV-M50 or the like, to evaluate the panel 102 in the infrared spectrum between about 700 nM and about 1100 nM. The first and second cameras 104 and 106 can be mounted on an adjustable support or fixture 108 that permits adjustment of the cameras 104 and 106 vertically and horizontally relative to the panel 102 for proper alignment with the panel 102. The adjustable fixture 108 can include a horizontal screw mechanism 110 or the like to move the cameras 104 and 106 horizontally relative to the panel 102 and the adjustable fixture 108 can include a similar vertical screw mechanism 112 or the like to move the cameras 104 and 106 vertically relative to the panel 102.

The panel 102 can be attached to a frame 114 and the frame 114 can be slidably mounted to an adjustable mechanism 115 that permits the panel 102 to be placed at a predetermined distance from the cameras 104 and 106 for alignment of a real-time image of the panel 102 with a stored image. The adjustable mechanism 115 can include a pair of tracks 116 and 118 that permit the frame 114 with the panel 102 attached to be moved toward or away from the cameras 104 and 106. The tracks 116 and 118 and the adjustable fixture 108 permit alignment of the cameras 104 and 106 relative to the panel 102 for precise superimposition or overlaying of real-time images of the panel 102 acquired by the cameras 104 and 106 with stored images of a standard or calibrated version of the same panel (not shown in the drawings) against which the panel 102 under test will be evaluated. The cameras 104 and 106 and the panel 102 are preferably contained in a light blocking enclosure 119 when the real-time images of the panel 102 are acquired for comparing with the stored images of the standard panel to provide a common environment for all tests and to duplicate the conditions under which the stored images of the standard panel are acquired.

The apparatus 100 further includes a central processing unit (CPU) 120. The digital video camera or first camera 104 can be coupled to a red, green, blue (RGB) frame grabber 122 contained in the CPU 120 and the digital monochrome camera or second camera 106 can be connected to a monochrome frame grabber 124 for low intensity and infrared testing applications. The monochrome camera 106 can also be connected to an overlay frame grabber 126 to acquire images for overlay functions such as alignment of the cameras 104 and 106 relative to the panel 102 for precise superimposition of the real-time images and the stored images. The RGB frame grabber 122 can be a National Instruments, Inc. model NI-1411 or the like and the monochrome frame grabber 124 can be a National Instrument, Inc. model NI-1408 or the like. The overlay frame grabber 126 can be a Data Translation, Inc. model DT-3155 or a similar frame grabber.

The CPU 120 also contains process control software 128. Depending upon the function being performed by the apparatus 100 or the type test being run, one of the frame grabbers 122, 124 or 126 captures a frame from the video images acquired by the particular camera 104 and 106 under control of the process control software 128 and the process control software 128 can display the image on a monitor 132 connected to the CPU 120.

The CPU 120 can also contain a storage device 130 to store monochrome and color digital images of a calibrated or standard illuminated panel (not shown in the drawings) similar to the illuminated panel 102. The storage device 130 can also be external to the CPU 120. The storage device 130 can contain a catalogue of images for different types of illuminated panels that can be tested by the apparatus 100 including digital monochromatic images and digital color images. The process control software 128 controls retrieval of stored images from the storage device 130.

The process control software 128 displays and overlays or superimposes a real-time image of the panel 102 with a corresponding stored image of a standard panel similar to the panel 102 on the monitor 132. An interface 134, such as a keyboard or the like, is connected to the CPU 120 to permit an operator to control the overall operation of the apparatus 100 by sending commands to the process control software 128. An operator can use the interface 134 to control the frequency at which the real-time color image and the stored color image are alternately displayed to facilitate detecting differences in the panel 102 being tested or evaluated.

FIG. 2 is a flow chart of a method 200 to evaluate an illuminated panel 102 in accordance with an embodiment of the present invention. In block 202, the illuminated panel 102 to be evaluated is mounted to the frame 114 in the light blocking enclosure 119. In block 204, power is applied to the panel 102 to cause all of the illuminated buttons, switches, displays or the like to be illuminated for evaluation. In block 206, a real-time monochromatic image of the illuminated panel 206 is acquired using the monochrome camera 106 and the overlay frame grabber 126. In block 208, the position of the cameras 104 and 106 is adjusted relative to the panel 102 under test to align the real-time monochrome image with a stored monochrome image of the standard illuminated panel. The frame 114 with the panel 102 attached may also be moved along the tracks 116 and 118 to facilitate the alignment of the cameras 104 and 106 with the panel 102 for proper alignment of the real-time images of the panel 102 under test with the stored images of the standard panel. In aligning the cameras 104 and 106 with the panel 102, the superimposed or overlaid images can appear to have a ghost. The cameras 104 and 106 can then be moved horizontally and vertically and the panel 102 can be slid toward or away from the cameras 104 and 106 until the ghost is eliminated. In block 210, another real-time monochrome image can be acquired using the monochrome camera 106 and the monochrome frame grabber 124. In block 212, the real-time monochrome image can be alternatively displayed at a predetermined frequency with a stored monochrome image to detect any light leaks or discrepancies in the panel 102. Even very small light leaks or discrepancies will show up on the real-time monochrome image as bright areas. Detecting light leaks is important for evaluating the use of the panel 102 with light amplifying devices, such as night vision goggles or the like. The smallest light leaks can be amplified by such devices and be distracting to a pilot or operator. Light leaks can also be distracting under nighttime conditions when night vision goggles or the like are not in use or in applications, such as non-military applications, where the panel 102 may not be expected to be used with light amplifying devices.

In block 214, a real-time color image of the illuminated panel 102 can be acquired by the color camera 104 and the RGB frame grabber 122 and in block 216, the real-time image and a similar stored image of a standard version of the same panel that are perfectly aligned can be superimposed or alternately displayed at a predetermined frequency to facilitate the detection of any differences or defects. Because of physiological characteristics of the human eye, alternating the properly aligned real-time and stored images will cause any differences in the panel 102 under test to appear to flash to the human eye. A predetermined frequency of about one second seems to be an optimum frequency for alternating the images; although, a person performing an evaluation with the apparatus 100 can control the rate at which the images are alternately displayed or manually toggle between the images as needed to evaluate any potential differences. Controlling the display of the images can be accomplished via the interface 134 and the process control software 128 (FIG. 1). While FIG. 2 indicates that the monochrome image is acquired and alternately displayed in blocks 210 and 212 before the color image is acquired and alternately displayed, these operations can be performed in any order.

In some circumstances, it may be desirable to divide an illuminated panel, such as panel 300 in FIG. 3, into multiple areas such as areas 302, 304, 306 and 308 for a more detailed evaluation and increased resolution. Real-time images can be acquired individually of each of the areas 302-308 and these real-time images can be compared to corresponding stored images of the same areas from a standard panel. The panel 300 may be too large and an image of the entire panel 300 will not provide enough detail or resolution for evaluation. For example, symbols or lettering etched or formed on buttons or switches may not be seen clearly unless an image of a smaller area containing these buttons and switches with a higher resolution is acquired and evaluated separately. A unique landmark or fiduciary point 310 may be formed on the panel 300 to aid with aligning the real-time images with the stored images.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. An apparatus to evaluate an illuminated panel, comprising:
    a camera to acquire a real-time digital color image of the illuminated panel, wherein the illuminated panel is an instrument panel for use in controlling operation of a vehicle;
    a stored digital color image of a standard or calibrated illuminated panel for use in controlling operation of a vehicle; and
    a monitor to alternately display the real-time image and the stored image for detection of any differences in the illuminated panel to substantially prevent any adverse affect on an operator of the vehicle;
    a second camera to acquire a real-time monochromatic digital image of the illuminated panel, wherein the monochromatic digital image and the color digital image are used to evaluate the panel under different, predetermined lighting conditions.

2. The apparatus of claim 1, further comprising:
    a second camera; and
    a frame grabber coupled to the second camera, wherein the second camera and the frame grabber are used to acquire a real-time monochromatic image of the illuminated panel to align the cameras relative to the illuminated panel.

3. The apparatus of claim 1, further comprising a second camera to acquire a real-time monochromatic image of the illuminated panel to detect light discrepancies from the panel.

4. The apparatus of claim 1, wherein the predetermined lighting conditions comprise sun light, night-time, and night vision goggle conditions.

5. The apparatus of claim 1, wherein the real-time image and the stored image are alternately displayed at a predetermined frequency to cause any differences between the images to appear to flash.

6. The apparatus of claim 1, further comprising an ambient light blocking enclosure, wherein the illuminated panel and the camera are contained in the light blocking enclosure when the digital color image is acquired.

7. The apparatus of claim 1, further comprising a frame to hold the illuminated panel, wherein the frame is adjustable relative to the camera to align the real-time image and the stored image.

8. The apparatus of claim 1, wherein the camera is mounted to a fixture, wherein the fixture is adjustable relative to the illuminated panel for alignment of the real-time image and the stored image.

9. An apparatus to evaluate an illuminated panel, comprising:
    a first camera to acquire a real-time digital color image of the illuminated panel, wherein the illuminated panel is an instrument panel for use in controlling operation of a vehicle;
    a stored digital color image of a standard or calibrated illuminated panel for use in controlling operation of the vehicle;
    a monitor to alternately display the real-time image and the stored image for detection of any differences in the illuminated panel to provide uniformity from one illuminated panel to another and to substantially prevent any adverse affect on an operator of the vehicle; and
    a second camera to acquire real-time digital monochromatic images of the illuminated panel.

10. The apparatus of claim 9, wherein the second camera is a monochromatic video camera and further comprising an overlay grabber coupled to the second camera to capture one of the real-time monochromatic images, wherein the one real-time monochromatic image is used to align the first and second cameras relative to the illuminated panel.

11. The apparatus of claim 9, further comprising a monochromatic frame grabber coupled to the second camera to capture one of the real-time monochromatic images to detect light leaks from the illuminated panel.

12. The apparatus of claim 9, further comprising a red, green and blue (RBG) frame grabber coupled to the first camera and wherein the first camera is a color video camera.

13. The apparatus of claim 9, wherein the real-time digital color image and the stored digital color image are alternately displayed at a predetermined frequency to cause any differences between the images to standout to the human eye.

14. The apparatus of claim 9, further comprising a light blocking enclosure, wherein the first and second cameras and the illuminated panel are contained in the light blocking enclosure when the digital images are acquired.

15. The apparatus of claim 9, wherein at least one of the digital cameras and the illuminated panel are mounted to an adjustable fixture to align the digital cameras relative to the illuminated panel.

16. A method of evaluating an illuminated panel, comprising:
    acquiring a real-time digital color image of the illuminated panel, wherein the illuminated panel is an instrument panel for use in controlling operation of a vehicle; and
    alternately displaying the real-time color image and a stored color image of a standard illuminated panel for detection of any differences to substantially prevent an adverse affect on an operator of the vehicle.

17. The method of claim 16, wherein the real-time image and the stored image are alternatively displayed at a predetermined frequency to cause any differences in the illuminated panel to standout.

18. The method of claim 16, further comprising adjusting at least one of a camera and the illuminated panel relative to each other to cause the real-time color image and the stored color image to be aligned when alternately displayed.

19. The method of claim 16, further comprising:
    acquiring a real-time monochromatic image of the illuminated panel; and
    adjusting at least one of a camera and the illuminated panel relative to each other using the monochromatic image to cause the real-time color image and the stored color image to be aligned when alternately displayed.

20. The method of claim 16, further comprising:
    acquiring a real-time monochromatic image of the illuminated panel; and
    detecting light leaks from the illuminated panel using the real-time monochromatic image.

21. The method of claim 20, wherein acquiring the real-time monochromatic image comprises:
acquiring video images of the illuminated panel; and
grabbing a frame of the video images.

22. The method of claim 16, further comprising enclosing a camera and the illuminated panel in an enclosure to block ambient light.

23. The method of claim 16, wherein acquiring a real-time digital color image of the illuminated panel comprises:
acquiring video images of the illuminated panel; and
grabbing a frame of the video images.

24. An apparatus to evaluate an illuminated panel, comprising:
a camera to acquire a real-time image of the illuminated panel, wherein the illuminated panel is an instrument panel for use in controlling operation of a vehicle:
a stored image of a standard or calibrated illuminated panel for use in controlling operation of the vehicle: and
a monitor to alternately display the real-time image and the stored image for detection of any differences in the illuminated panel to substantially prevent any adverse affect on an operator of the vehicle:
wherein the camera comprises a monochromatic camera to acquire a real-time monochromatic image of the illuminated panel, and wherein the apparatus further comprises a second camera to acquire a real-time color image of the illuminated panel.

25. A method to evaluate an illuminated panel, comprising:
acquiring a real-time image of the illuminated panel, wherein the illuminated panel is an instrument panel for use in controlling operation of a vehicle: and
alternately displaying the real-time image and a stored image of a standard illuminated panel for detection of any differences to provide uniformity from one panel to another and to substantially prevent an adverse affect on an operator of the vehicle:
wherein acquiring a real-time image of the illuminated panel comprises acquiring a real-time color image, and wherein the method further comprises acquiring a real-time monochromatic image for detecting any differences in the illuminated panel.

* * * * *